Sept. 30, 1969  J. M. OLCHAWA  3,469,806

DRIVE MECHANISM OPERATING AGAINST VARIABLE RESISTANCE

Filed Feb. 9, 1968  5 Sheets-Sheet 1

INVENTOR
JOSEPH M. OLCHAWA

BY Burgess, Ryan & Hicks
ATTORNEYS

INVENTOR
JOSEPH M. OLCHAWA

BY
ATTORNEYS

Sept. 30, 1969  J. M. OLCHAWA  3,469,806

DRIVE MECHANISM OPERATING AGAINST VARIABLE RESISTANCE

Filed Feb. 9, 1968  5 Sheets-Sheet 5

INVENTOR
JOSEPH M. OLCHAWA

BY
Burgess, Ryan & Hicks
ATTORNEYS

United States Patent Office 3,469,806
Patented Sept. 30, 1969

3,469,806
DRIVE MECHANISM OPERATING AGAINST VARIABLE RESISTANCE
Joseph M. Olchawa, Western Springs, Ill., assignor to Hewitt-Robins Incorporated, Stamford, Conn., a corporation of Delaware
Filed Feb. 9, 1968, Ser. No. 704,441
Int. Cl. B64c *3/56;* F16h *57/10;* F16d *65/24*
U.S. Cl. 244—46                               11 Claims

ABSTRACT OF THE DISCLOSURE

The invention deals with a drive mechanism operating against variable resistance and provides for automatic controls against overrunning or overhauling operations resulting from reduced resistances. The drive mechanism includes a power transmitting feed screw of high efficiency such as a power transmitting feed screw of the anti-friction ball type, and to compensate for this high efficiency and to prevent consequent overrunning of the drive mechanism when the load on said feed screw is low, brake means are provided for said drive mechanism, normally inoperative but automatically put into operation, when the load is reduced below a predetermined value.

---

The present invention relates to a drive mechanism operating against variable resistances and having automatic controls against overrunning or overhauling operations resulting from variable resistances.

In a certain type of drive mechanism operating in a fluid medium against the resistance of the fluid, and movable relative to the fluid so that said resistance varies, this drive mechanism may race or overrun undesirably when the resistance is reversed or is reduced to a low level. For instance, in certain types of aeroplanes, flaps and wings on said aeroplanes are actuated according to the desired conditions of flight. For example, in a so-called wing sweep plane, the wings are swept outwardly into extended position in relation to the fuselage on take-off, and are folded back in position close to the plane during normal or high speed flight. Depending on the speed of the plane, its altitude, its direction in relation to the direction of the wind, and the velocity of the wind, the resistance to the actuation of the wings into swept or extended position depends on these different factors. Under these conditions, when the resistance to these adjusting movements of the wings is low or is a negative direction to assist the drive effecting these adjustments, the drive mechanism may overrun or race, so that the actuation of the wings is not performed in good, constant and established order.

Drive mechanisms for actuating plane flaps and wings have comprised a feed or power transmission screw such as an Acme screw of low efficiency, so that at low resistance, the low efficiency of the power transmission screw makes up by its retarding influence for this low resistance, and prevents overrunning or racing of the drive mechanism. As a result of this low drive efficiency, it is necessary to provide larger and heavier power and drive unit to compensate for this low drive efficiency, thereby unfavorably adding to the size and weight of the plane.

One object of the present invention is to provide a new and improved drive mechanism designed to operate against variable resistance under automatic control to maintain an established output speed irrespective of such variations.

Another object of the present invention is to provide new and improved drive mechanism having a high efficiency power transmitting feed screw and designed so that said drive mechanism will operate against variable resistance with automatic control maintaining an established speed of transmission, irrespective of such variations, and notwithstanding the high efficiency of its power transmitting screw.

In accordance with a specific embodiment of the present invention, there is provided a main shaft, motor means for driving said main shaft, and means driven from said shaft for adjusting the position of an adjustable member relative to a supporting structure, such as an airplane wing relative to the fuselage of the plane. As a feature of the present invention, this driven means includes a high efficiency power transmission feed ecrew, and more specifically, although not limited to an anti-friction ball screw assembly. Brake applying means retard the movement of said feed screw with force varying inversely as the resistance to the movement of said feed screw decreases. As a further feature, the main shaft can be driven in either direction in accordance with the direction of adjustment of the aforesaid adjustable member, and there is provided a dual alternately operable system at output sides of said main shaft, comprising two such brake applying means and two overruning clutches for transmitting torques to said two brake applying means respectively, said overrunning clutches being oppositely torque oriented to cause one clutch or the other to transmit torque to the corresponding brake applying means according to the direction of rotation of the main shaft, to render either brake applying means responsive to the variations in resistance offered to the movement of the ball feed screw.

As a further feature, the motor means for driving the main shaft constitutes hydraulic motor means in which the hydraulic operating pressure varies as the resistance to the operation of said motor means varies and the hydraulic pressure employed in operating said motor means is utilized in controlling the braking action of the brake applying means.

Various other objects, features and advantages of the present invention are apparent from the following description and from the accompanying drawings, in which FIG. 1 is a diagrammatic top plan view of an overall system embodying the present invention, and shown applied to the adjustment of the side wings of an airplane;

Figure 1:
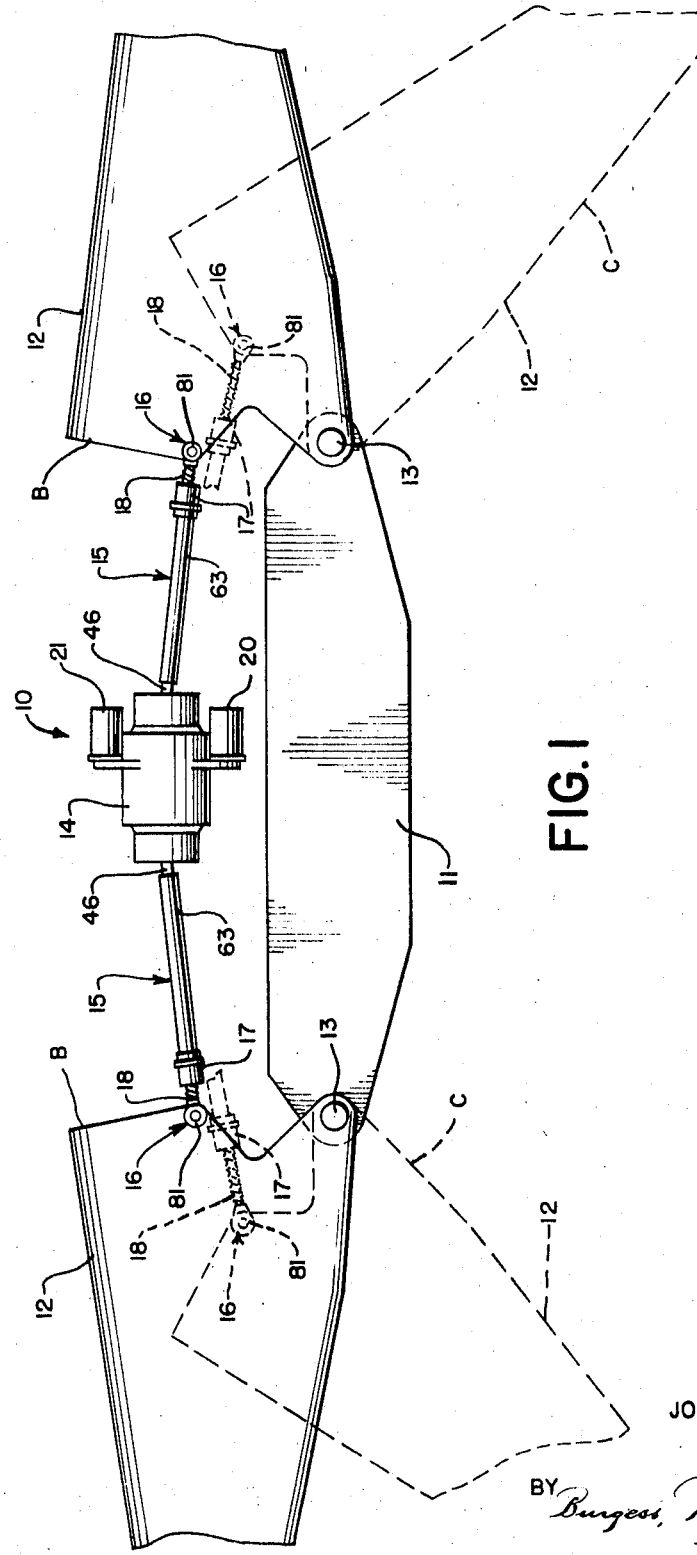
Figure 2:
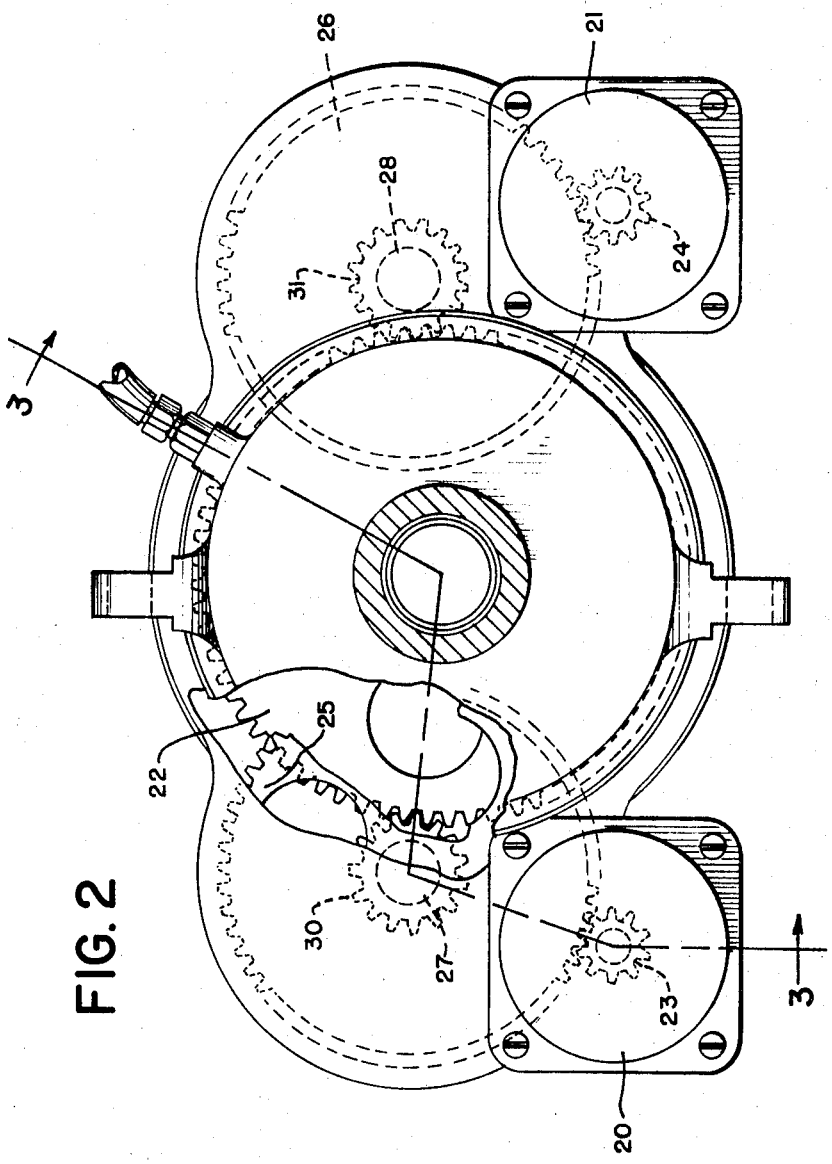
FIG. 2 shows an end view of a speed reducing gearbox unit, constituting part of the system of the present invention and showing the gear train transmission from two hydraulic motors to the main drive shaft of the unit.

Referring to FIG. 1 of the drawings, the present invention is shown applied to an actuator 10 for effecting wing sweep in a wing sweep airplane. The drawing shows a supporting structure 11, which is rigid with the fuselage of the plane, and wings 12 pivotally mounted on said structure at 13 and swingable about the pivot axis between forward wing position B shown in full lines and swept wing position C shown in dash lines. The actuator 10 comprises, in general, a center speed reducing gearbox drive unit 14 and two ball power transmission feed screw assemblies 15, operated in unison from opposite sides of said drive unit and pivotally secured at 16 to the wings 12. As feed screw nuts 17 in the assemblies 15, threaded to ball feed screws 18 in said assemblies, are rotated through the drive unit 14, said feed screws 18 are moved axially. The feed screws 18 are pivotally connected to the wings 12 at 16. Consequently the axial movement of the feed screws 18 as described, causes the wings 12 to swing into selected position about the axes of their pivot supports at 13.

The center gearbox unit 14 shown in FIGS. 1, 2, 3, 6, 7 and 8 is driven by a pair of similar hydraulic drive motors 20 and 21, which operate by hydraulic pressure varying according to the load on said motors, and which may be of the positive displacement axial piston type. The hydraulic motors 20 and 21 drive a main center gear 22 through a speed reducing gear train comprising drive pinions 23 and 24 on the shafts of said hydraulic motors, meshing with large gears 25 and 26 secured to shafts 27 and 28 respectively. These shafts 27 and 28 in turn carry rigid therewith respective pinions 30 and 31 meshing with the large center gear 22. This center gear 22 is shown integral with a short hollow main shaft 32, journalled in bearings 33. The balanced and symmetrical gear arrangement shown serves to drive the shaft 32 at a comparatively slow speed but with high torque.

The opposite ends of the main shaft 32 drive two stub shafts 40 and 41 through respective universal joints 42 and 43. Since the mechanism including the gearbox drive unit 14 and the ball screw assemblies 15 is duplicated on opposite sides of the main gear 22, except in certain respects to be pointed out hereinafter, only the left hand side of this mechanism will be described.

The stub shaft 40 constitutes the shank of a knuckle 45 forming part of the universal joint 42 and is splined at 44 to a hollow shaft 46, the inner end 47 of which constitutes the male member of a ball joint 48. The external surface 50 of this male ball joint member 47 is spherical and concentric with the intersection D of the rectangularly positioned axes of the universal joint 42. This male ball joint member 47 is conformably received within a female mating race having a corresponding spherical contour and forming part of a pillow block made up of two components 52 and 53 secured together by a series of bolts 54. The pillow block component 52 has an annular radial flange 55 flanked by axial thrust roller bearings 56, and the two pillow block components 52 and 53 are supported against radial loads by ball bearing units 57 and 58.

The female ball joint race or pillow block 52, 53 is splined to the male ball joint member 47 in a manner to cause said pillow block to rotate with said joint member 47 by the drive action of the main shaft 32, while permitting said male ball joint member 47 and in turn the hollow shaft 46 integral therewith to tilt angularly about the axes intersection D of the universal joint 42. For that purpose, the spline connection comprises a number of radial cylindrical pins 60, four being shown, quadrantly arranged; these pins 60 are firmly secured to the male ball joint member 47 and extend into respective grooves 61 in the pillow block 52, 53 extending in the longitudinal direction of the shaft 46. The grooves 61 have a length along this longitudinal direction greater than the diameter of the pins 60 to permit these pins to tilt about the axes intersection D of the universal joint 42 and along the length of said grooves and have a width just sufficiently wider than the diameter of said pins to permit said pins to tilt in said grooves with a snug slide fit, while causing said pins to drive the pillow block 52, 53 with no lost motion. The purpose of driving the pillow block 52, 53 will be made apparent hereinafter.

Figure 4:
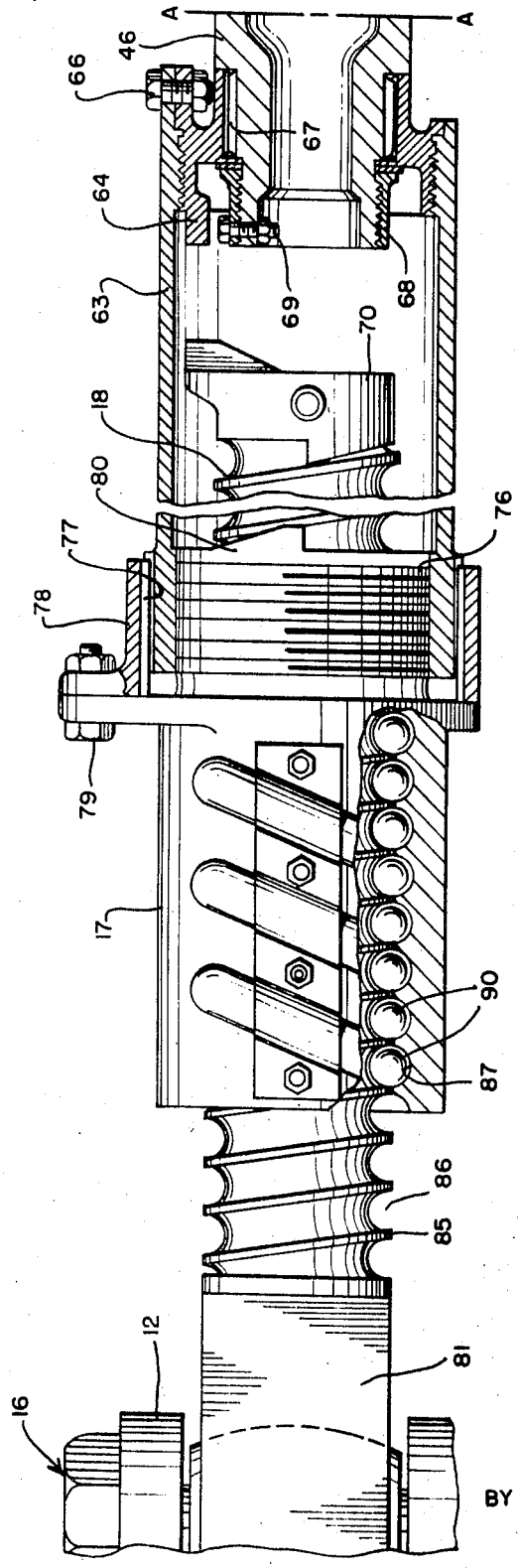
FIG. 4 is a side view of the feed screw power transmission assembly shown partly in section and forming a continuation of the part of the feed screw assembly shown in FIG. 3, said view being shown with a plane A—A of severance matching the plane of severance A—A in FIG. 3.
Figure 6:
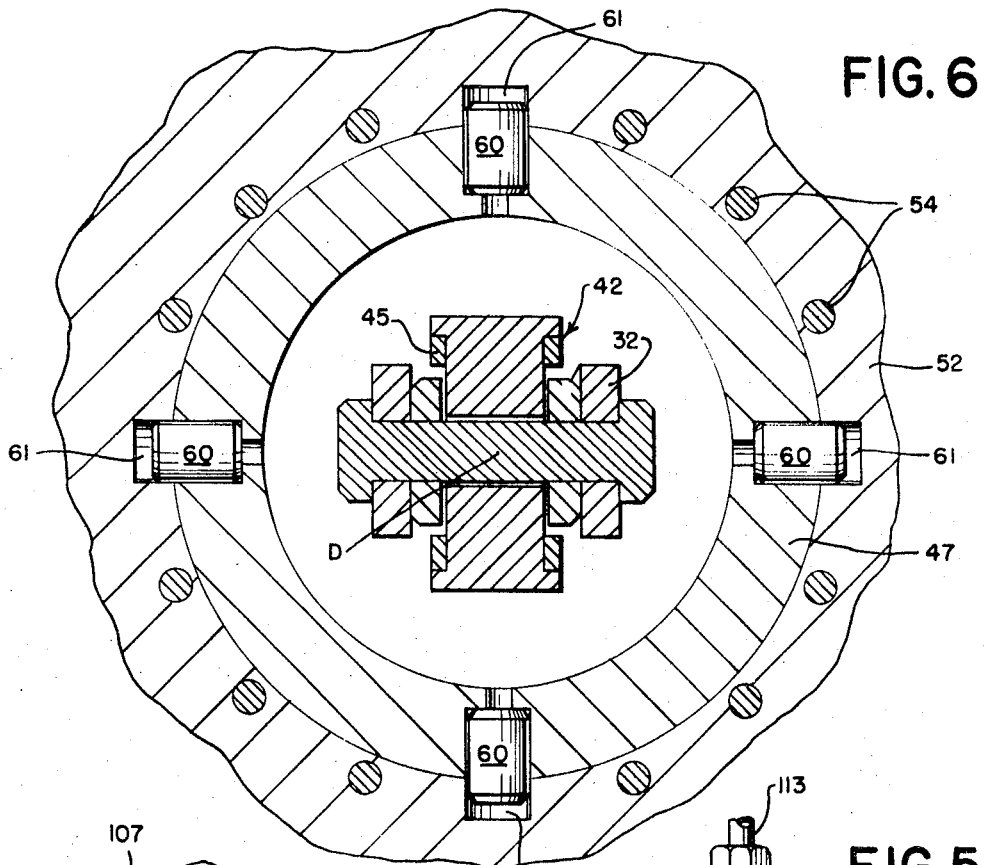
FIG. 6 is a section of the gearbox unit taken on lines 6—6 of FIG. 3.

The hollow shaft 46 has integral therewith or has otherwise rigidly connected at its inner end the male ball joint member 47, as previously described, and has secured thereto at its other outer end, the inner end of a long shaft 63 in the form of a cylindrical sleeve (FIG. 4), in and along which the feed screw 18 extends. The connection between the shafts 46 and 63 comprises an emergency retract stop 64 for the feed screw 18 threaded to the inner end of the shaft 63, and secured to said shaft against rotation by means of a bolt 66. The outer end of the shaft 46 is keyed to the retract stop 64 by splines 67, and is secured to said stop against axial displacement relative thereto by a lock nut 68, screwed onto the outer end of the shaft 46 and bearing against said stop; a bolt 69 secures the lock nut 68, the stop 64 and the shaft 46 against relative axial movements. By means of the construction described, the shafts 46 and 63 are coupled for rotation together.

The feed screw 18 has pinned thereto at its inner end a positive type torsion dog stop 70 adapted to mesh with clutching engagement the retract stop 64 in retracted limiting position of the feed screw, to stop further movement of the corresponding wing 12 (FIG. 1) about its pivotal support 13 when the wing reaches the laterally extended position B (FIG. 1). The meshing stops 64 and 70 not only check the feed screw 18 against axial movement towards the right (FIG. 4) but also stops further rotation of the shaft 46 in the direction causing movement of the feed screw towards the right, while permitting said shaft to rotate in the opposite direction. The retract stop 64 comes into play only in case of emergency because in normal operation the feed screw 18 does not reach a limiting position in which it is checked by said stop.

The outer end of the shaft 63 is connected to the feed screw nut 17 threaded onto the power transmission feed screw 18, so that as said shaft is rotated, the feed screw nut rotating therewith causes the feed screw 18 to move axially without rotating. For securing the shaft 63 to the feed screw nut 17, the nut has an inner end extension 76, integral therewith, and threaded to the outer end of the shaft, and is locked to said shaft against rotation relative thereto by splines 77 between said shaft and a length adjusting lock ring 78, secured to said feed screw nut by a bolt 79. The nut end extension 76 has a positive type emergency torsional dog stop conformation 80 for cooperation with one side of the stop 70 on the feed screw 18 with clutch interengagement, when the screw has reached the limit of its outward movement and the corresponding wing 12 has reached the limiting position C shown in FIG. 1. The arrangement described couples the shaft 63 and the feed screw nut 17 for rotation in unison and permits adjustments in the length of the stroke of the feed screw 18.

The outer end of the feed screw 18 projects outwardly beyond the outer end of the feed screw nut 17 and terminates in an eye 81 having a bearing for pivotal connection to the wing 12 at 16.

In the operation of the device so far described, when positioning of the wings 12 is required, the operation of the hydraulic pumps 20 and 21 in the appropriate direction is initiated, this causing the shaft 32 to rotate in the corresponding direction, depending on whether the wings are to be moved from position B to position C, or from position C to position B. This rotation of the main shaft 32 drives the male ball member 47 through the universal joint 42, and this causes the rotation of the shaft 46, the shaft 63 and in turn the feed screw nut 17. This operation moves the power transmission feed screw 18 axially in the appropriate direction to actuate the corresponding wing 12 in the desired direction.

As an important feature of the present invention, instead of employing the usual Acme feed screw of low efficiency to retard overrunning of the wing 12, the feed screw 18 is of a type offering low resistance in its operation and consequently affording high efficiency, and this low resistance to wing overrun is compensated for by an automatically controlled brake device to be described. The feed screw 18 for this purpose is of the anti-friction ball type, in which its helical thread 85 defines a helical groove 86 of semi-circular cross-section, and the helical groove 87 in the feed screw nut 17 is correspondingly contoured to complement said groove 86. The grooves 86 and 87 conjointly receive a helical row of anti-friction spherical balls 90 of size substantially corresponding to that of said grooves for rolling contact with the walls of said grooves.

The compensating brake device described, when effective, is intended to act on the pillow block 52, 53 through the ball joint 48, thereby applying a restraining torque on the feed screw nut 17 and in turn applying a restraining axial thrust on the power transmission feed screw 18. For that purpose, the pillow block 52, 53 is enclosed in a housing 95 (FIGS. 3 and 5), which is fixedly secured by means of mounting blocks 96 to a structure rigid with the fuselage of the plane, such as the supporting structure 11 (FIG. 1). The pillow block component 52 has a cylindrical axial extension 97 (FIGS. 3, 5, 6, 7 and 8) in the housing 95. Encircling the pillow block extension 97 is a sleeve 98, supported on said extension against radial loads by means of spaced ball bearing units 100 and 101. The sleeve 98 and the pillow block extension 97 form the inner and outer races of an overrunning clutch 102 between the bearing units 100 and 101, and between the sleeve 98 and the housing 95 is a brake disc device 103, the sleeve 98 constituting one element of this brake device. When drive torque is transmitted to the sleeve 98 through the overrunning clutch 102 upon rotation of the main shaft 32 in one direction, the brake device 103 is rendered effective under certain overrunning or overhauling conditions transmitted by the wing 12 to the feed screw nut 17. The overrunning clutch 102 on the left hand side of the gearbox unit 14 cooperating with the brake device 103, is oriented to transmit torque to the sleeve 98 on the corresponding side of the gearbox unit, when the main shaft 32 is rotating in one direction, and the other overrunning clutch 102a on the right hand side of the gearbox unit, cooperating with a brake device 103a similar to the brake device 103, is torque oriented in a reverse direction to idle without torque transmission, while said main shaft 32 is rotating in said one direction. By means of this reverse torque orientation of the overrunning clutches 102 and 102a, either brake device 103 or brake device 103a is rendered effective, according to the direction of rotation of the main shaft 32.

Figure 3:
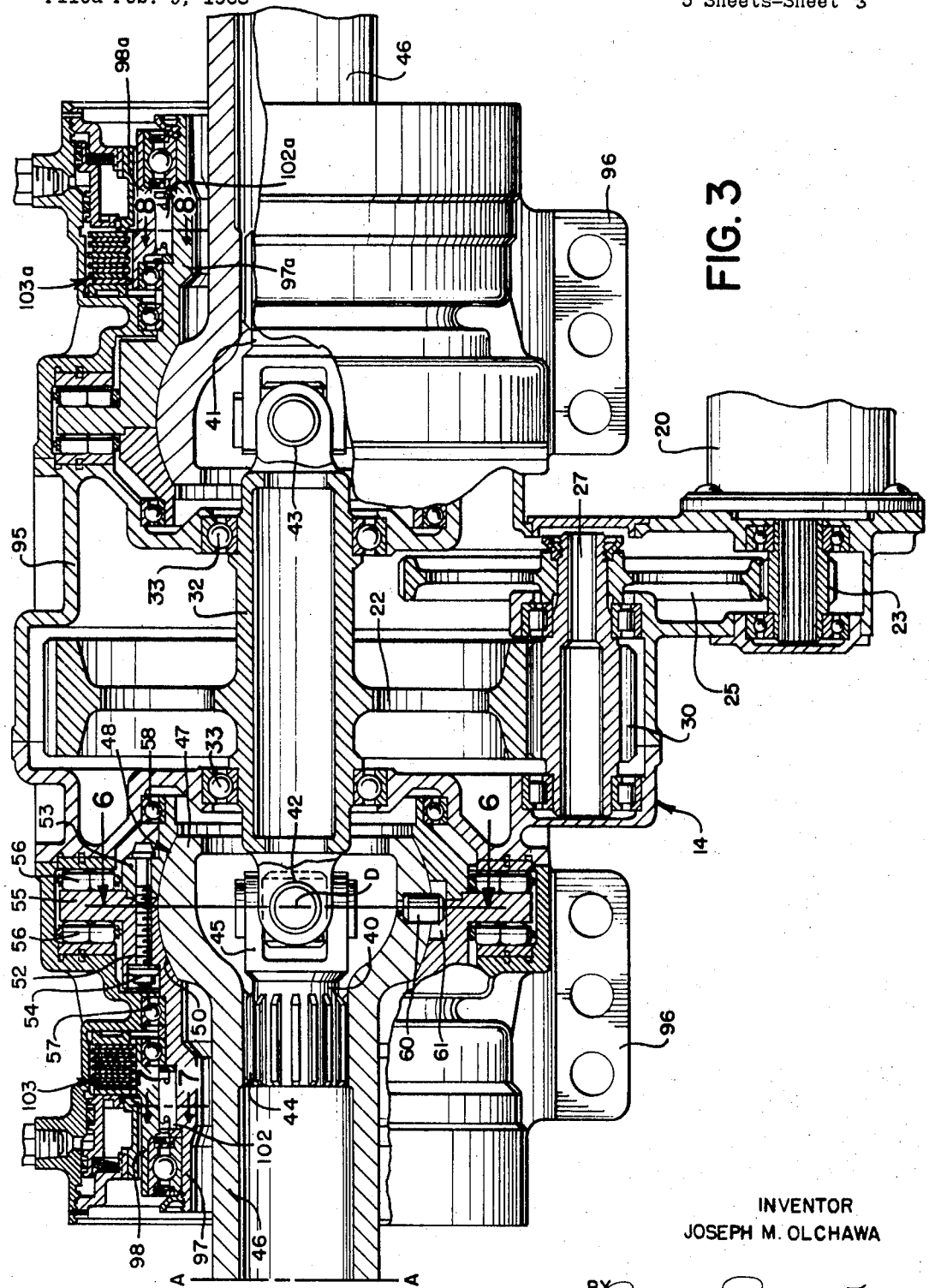
FIG. 3 is a section of the speed reducing gearbox unit of the present invention, taken on lines 3—3 of FIG. 2 and showing a small end part of the feed screw power transmission assembly for transmitting adjusting power to the plane wings, this part being shown terminating at an arbitrary plane of severance A—A.
Figure 7:
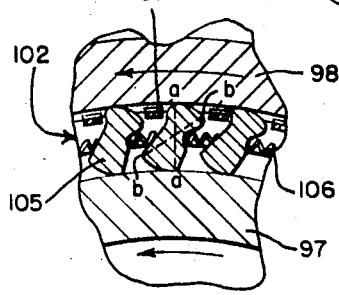
FIG. 7 is a section of the overrunning clutch shown somewhat diagrammatically, taken on lines 7—7 of FIG. 3.
Figure 8:
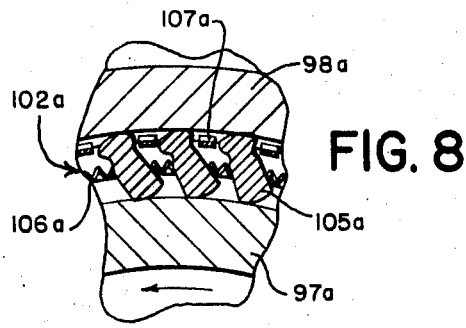
FIG. 8 is a section of the overrunning clutch shown somewhat diagrammatically taken on lines 8—8 of FIG. 3.

The overrunning clutch 102 on the left side of the gearbox unit 14 (FIG. 3) is shown diagrammatically in FIG. 7, and the overrunning clutch 102a is shown diagrammatically in FIG. 8. These overrunning clutches 102 and 102a may be of any well-known type, and in the specific form illustrated, they are of the sprag type. Referring to FIGS. 3 and 7, the clutch 102 comprises a complement of sprags or wedges 105 located between the concentric races 97 and 98 and transmitting power from the inner race 97 to the outer race 98 by the wedging action of the sprags. Expanding coil springs 106 keep the sprags 105 in continuous contact with both inner and outer races 97 and 98, so that driving torque is transmitted instantaneously between races without lost motion, and spacers 107 keep the sprags separated. The sprags 105 are designed with dimension a—a in each sprag so related to the dimension b—b, that rotation of the inner race 97 counterclockwise (FIG. 7) causes the sprags to wedge, thereby transmitting driving torque in full from the inner race 97 to the outer race 98, and rotation of the inner race in the opposite direction, releases the sprags from wedging position relative to the races, and causes the inner race to idle without transmitting torque. Under these conditions, the outer race 98 receives no driving torque.

The overrunning clutch 102a on the right side of the gearbox unit 14 (FIG. 3), is similar to the clutch 102 on the left hand side, except that the sprags 105a (FIGS. 3 and 8) are tilted in an opposite direction, so that counterclockwise rotation of the inner race 97a, transmits no torque to the outer race 98a, while rotation of the inner race 97a clockwise, does transmit full driving torque to the outer race 98a.

With the arrangement described, rotation of the main shaft 32 in either direction causes either of the clutches 102 or 102a to transmit torque to the corresponding brake device 103 or 103a.

The brake device 103 (FIGS. 3 and 5) comprises a piston 110 in the form of a ring, concentric with the axis of the main shaft 32 and slidable axially along the housing 95 in slide contact with the inner cylindrical surface of the peripheral wall thereof. This piston 110 has an outer circumferential groove 111 in communication with a port 112 extending through the wall of the housing 95 and having a pipe connection 113 to the hydraulic system which runs the motors 20 and 21, so that the hydraulic pressure in said port corresponds automatically to the load on said motors. Therefore, when the load on the motors 20 and 21 is heavy, the hydraulic pressure operating said motors and in the port 112 is correspondingly heavy.

Figure 5:
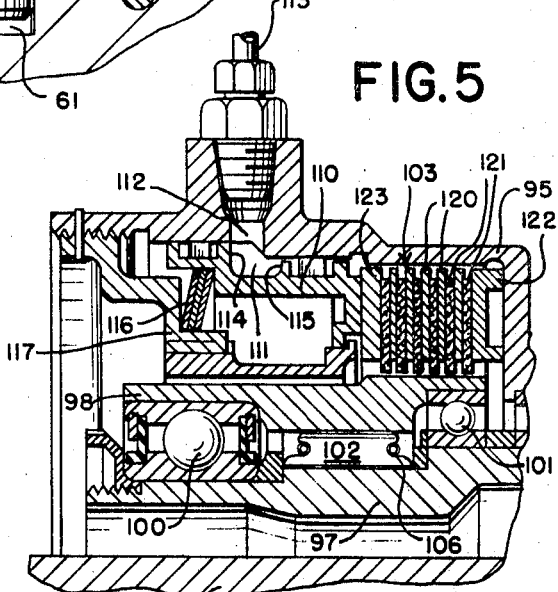
FIG. 5 is an enlargement of an overrunning clutch and brake applying part of the gearbox unit shown in FIG. 3.

The inner cylindrical surfaces of the wall of the housing 95 flanking the port 112 are of different diameters, so that the circumferential groove 111 on the piston 110 has one annular radial side surface 114 greater in area than the other annular radial side surface 115. The pressure of the hydraulic fluid conducted to the circumferential piston groove 111 will, therefore, exert a resultant force on the piston 110, tending to move the piston to the left (FIGS. 3 and 5). A spring 116 bears at one end against an annular web 117 threaded into and pinned to one end of the housing 95 and bears at the other end against an axially facing annular shoulder on the piston 110. This spring 116 counteracts the resultant hydraulic force on the piston 110.

The braking part of the brake device 103 is of the well-known disc type, and comprises a plurality of spaced discs 120 splined to the housing 95 to lock said discs to said housing against rotation, while permitting said discs to move axially. Splined to the sleeve 98, serving as the outer race of the overrunning clutch 102, is a plurality of discs 121 interleaved between the discs 120. The discs 121 are locked for rotation with the sleeve or outer clutch race 98 but are free to move axially. The bank of brake discs 120 and 121 is held at one end by a fixed bearing plate 122 and is pressed at the other end by an axially movable ring disc 123 against which the end of the piston 110 bears. When the hydraulic pressure in the piston groove 111 is low enough to be overwhelmed by the pressure of the coil spring 116, the piston 110 is moved to the right (FIGS. 3 and 5), thereby bringing the discs 120 and 121 together in friction contact to brake the sleeve 98 against rotation, or at least to retard its speed of rotation depending on the hydraulic pressure. This braking action is transmitted to the inner clutch race or pillow block component 97, and in turn to the feed screw nut 17, and the extent of braking action increases as the resultant hydraulic pressure acting on the piston 110 increases.

In the operation of the actuator 10 of the present invention, when it is desired to move the wings 12 angularly from one position to another in relation to the fuselage, the motors 20 and 21 are operated in the appropriate directions to turn the feed screw nuts 17 in the corresponding direction. While the resistance to the movement of the wings 12 is normal, the hydraulic pressure acting on the two pistons 110 on opposite sides of the gearbox unit 14 is high enough to move the pistons axially against the action of the springs 116 away from each other, so that the brake devices 103 and 103a are inactive, even though one of the overrunning clutches 102 or 102a is engaged and transmitting torque to the corresponding outer race 98 or 98a, according to the direction of rotation of the shaft 32.

Assuming that the direction of the flight of the plane and the direction of the wind are such as to assist the wings 12 in their movements relative to the fuselage, the power transmitting feed screw 18 under these conditions, tends to race and overrun. This condition is reflected in a corresponding reduction in the load on the hydraulic motors 20 and 21, causing the hydraulic pressure actuating said motors to be correspondingly reduced. Assuming that the shaft 32 is rotating in a counterclockwise direction causing corresponding rotation of the inner clutch race 97 of the overrunning clutch 102 (FIG. 7), this will cause the driving torque to be fully transmitted to the outer clutch race 98, so that the brake discs 121 splined to said outer race are rotated. At the same time, the reduced hydraulic pressure acting on the piston 110, will cause the piston to move to the right under the action of the spring 116, thereby moving the discs 120 and 121 in the brake device 103 axially into frictional interengagement. This operation applies a brake on the outer clutch race 98 and thereby applies a brake to the shaft 46, the shaft 63 and the feed screw nut 17. Consequently, a corresponding restraining force is applied to the feed screw 18, preventing it from racing or overrunning axially. The extent of this restraining force on the feed screw 18 depends on the resistance offered to the adjusting movement of the corresponding wing 12, increasing as this resistance decreases. Since the actuation of the two wings 12 is effected through the common main shaft 32, the restraining influence described is applied equally to both wings.

During the operation described, the overrunning clutch 102a is idling and the brake device 103a is ineffective.

Assuming that the wings 12 are to be moved angularly in a direction opposite from that just described, the motors 20 and 21 are operated in the appropriate direction to cause the overrunning clutch 102a to transmit its full torque to the brake device 103a and to control the action of the feed screw 18 on the right hand side of the gearbox unit 14 against overrunning or racing through the retarding action of said brake device 103a. During these operations the overrunning clutch 102 is idle and transmitting no torque to the corresponding brake device 103. Consequently, this brake device is ineffective during this phase of operation.

Although the invention has been shown applied specifically to the control of the adjusting movements of the wings or flaps of an aircraft, as far as certain aspects of the invention are concerned, the invention can be applied to any drive mechanism in which the resistance to the movement of a member driven by said mechanism varies, and it is desired to control this movement for substantially uniform action in response to the resistance.

What is claimed is:

1. A drive mechanism comprising power drive means on the input side of the drive mechanism for driving said mechanism, output driven means on the output side of said mechanism, power transmission means between said power drive means and said driven means for movably actuating said driven means against a load applied to said driven means and reacting against its actuation, and brake applying means automatically responsive to variations in the load applied to said driven means for applying a retarding force to said power transmission means when said load drops below a predetermined level, said drive mechanism being supported on a vehicle adapted to move in a fluid, said vehicle having wing means adjustable relative to the body of said vehicle for controlling the movement of the vehicle through said fluid, and said driven means having means for connection to said wing means to drive said wing means for adjustment.

2. A drive mechanism as described in claim 1, wherein said drive mechanism is supported on an airplane constituting said vehicle, and said wing means serve to control the flight of said airplane in accordance with the adjusted position of said wing means.

3. A drive mechanism comprising power drive means on the input side of the drive mechanism for driving said mechanism, output driven means on the output side of said mechanism, power transmission means between said power drive means and said driven means for movably actuating said driven means against a load applied to said driven means and reacting against its actuation, and brake applying means automatically responsive to variations in the load applied to said driven means for applying a retarding force to said power transmission means when said load drops below a predetermined level, said drive mechanism being supported on an airplane having wing means movably adjustable for controlling the flight of said airplane, said driven means comprising a power transmitting feed screw member of the anti-friction ball type, feed screw nut member threaded on said feed screw, means for driving one of said members axially upon rotation of the other member and means for connecting the axially movable member to said wing means for adjustably moving said wing means, said power drive means comprising hydraulic motor means in which the operating pressure of the hydraulic motor means varies according to the load on said motor means, and said brake applying means is responsive to said operating hydraulic pressure.

4. A drive mechanism for movably actuating two wings on the opposite sides of the fuselage of an airplane and movably adjustable in relation to said fuselage, comprising power drive means on the input side of the drive mechanism for driving said mechanism, output driven means on the output side of said mechanism having connecting means on its output side for driving said wings for adjusting actuation, power transmission means between said power drive means and said driven means for driving said driven means comprising a speed reducing gear train having an output shaft, brake applying means operable to retard rotation of said shaft, and means for rendering said brake applying means automatically inoperative when the load on said shaft is above a predetermined value and for rendering said brake applying means automatically operative when the load on said shaft is below a predetermined value.

5. A drive mechanism as described in claim 4, said power drive means constituting hydraulic motor means in which the hydraulic operating pressure varies according to the load on said hydraulic motor means, said means for rendering said brake applying means operative and inoperative being automatically responsive to said hydraulic operating pressure to render said brake applying means operative when said hydraulic operating pressure falls below a predetermined value.

6. A drive mechanism as described in claim 4, said brake applying means being of the slidable disc type in which the discs of one set are held against rotation relative to the fuselage, while being axially slidable, and the discs of the other set are interleaved between the discs of said one set and are rotatable and axially slidable, said brake applying means comprising coupling means between said other set of discs and said shaft for transmitting braking torque from said other set of discs to said shaft, when said discs are brought together axially into friction braking contact, said means for rendering said brake applying means operative including means responsive to the load on said shaft for moving said discs axially into friction braking contact when said load falls below a predetermined value.

7. A drive mechanism as described in claim 4, said output driven means comprising power transmitting feed screw means of the anti-friction ball type and feed screw nut means threaded onto said feed screw means.

8. A drive mechanism as described in claim 4, said brake applying means comprising two brake applying units, said drive mechanism comprising two overrunning clutches between said shaft and said units respectively, one of said clutches coupling one of said brake applying units to said shaft automatically when said shaft is rotated in one direction, to apply braking torque to said shaft against rotation in one direction, and the other clutch coupling the other brake applying unit to said shaft automatically when said shaft is rotated in the opposite direction.

9. A drive mechanism as described in claim 4, said brake applying means being of the slidable disc type in which the discs of one set are held against rotation relative to the fuselage, while being axially slidable, and the discs of the other sett are interleaved between the discs of said one set and are rotatable and axially slidable, said brake applying means comprising spring means acting to bring the discs of the two sets axially into frictional braking contacts and coupling means between said other set of discs and said shaft for transmitting braking torque from said other set of discs to said shaft, when said discs are brought together axially into frictional braking contact, said power drive means constituting hydraulic motor means in which the hydraulic operating pressure varies according to the load on said hydraulic motor means, said brake applying means comprising means responsive to the hydraulic operating pressure for appplying a counterbalancing force on said spring means, said counterbalancing force being normally high enough to prevent said spring means from bringing the discs of the two sets into frictional braking contact, to render said brake applying means inoperative, when the load on said shaft is above said predetermined value, and being low enough when said load is below said predetermined value to permit said spring means to bring the discs of the two sets into frictional braking contact.

10. A drive mechanism as described in claim 9, said output driven means comprising power transmitting feed screw means of the anti-friction ball type and feed screw nut means threaded onto said feed screw means.

11. A drive mechanism as described in claim 4, said brake applying means comprising two brake units, each of the slidable disc type in which the discs of one set are held against rotation relative to the fuselage, while being axially slidable, and the discs of the other set are interleaved between the discs of said one set and are rotatable and axially slidable, said brake applying means comprising two overrunning clutches between said shaft and the rotatable discs of the two brake units, one of said clutches coupling one of said brake units to said shaft automatically when said shaft is rotated in one direction, to apply braking torque to said shaft against rotation in one direction, when the load falls below said predetermined value, and the other clutch coupling the other brake unit to said shaft automatically when said shaft is rotated in the opposite direction.

References Cited

OTHER REFERENCES

| 2,376,636 | 5/1945 | Thompson | 244—43 |
| 3,034,619 | 5/1962 | Glasgow et al. | 192—7 |
| 3,381,918 | 5/1968 | Jacquart et al. | 244—46 |

FOREIGN PATENTS 712,023   7/1954   Great Britain.

MILTON BUCHLER, Primary Examiner

RICHARD A. DORNON, Assistant Examiner

U.S. Cl. X.R.

74—411.5; 188—170; 192—4